United States Patent [19]
Syed et al.

[11] Patent Number: 6,105,030
[45] Date of Patent: Aug. 15, 2000

[54] METHOD AND APPARATUS FOR COPYING DATA THAT RESIDES IN A DATABASE

[75] Inventors: Nadeem Syed, Castro Valley; Kurt Robson, Foster City, both of Calif.

[73] Assignee: Oracle Corporation, Redwood Shores, Calif.

[21] Appl. No.: 09/032,095

[22] Filed: Feb. 27, 1998

[51] Int. Cl.[7] .................................................. G06F 17/30
[52] U.S. Cl. ................................................ 707/10; 707/2
[58] Field of Search ........................ 707/1–10, 100–104, 707/200–206, 500–542; 705/1–11

[56] References Cited

U.S. PATENT DOCUMENTS

| | | | |
|---|---|---|---|
| 5,168,444 | 12/1992 | Cukor et al. ................................. | 705/1 |
| 5,560,005 | 9/1996 | Hoover et al. ............................. | 707/10 |
| 5,724,575 | 3/1998 | Hoover et al. ............................. | 707/10 |

*Primary Examiner*—Ruay Lian Ho
*Attorney, Agent, or Firm*—McDermott, Will & Emery

[57] ABSTRACT

A consistent set of data is supplied to a software application from databases. When a particular set of data is identified, a first process is requested to obtain a snapshot time from a database server associated with the first database. The snapshot time causes all subsequent reads of the first database by the first process to return data that reflects a database state associated with the snapshot time. A first set of data in the first database is locked in order to produce a copy of data from a first database. After locking the first set of data, a plurality of processes are requested to obtain snapshot times from a database server associated with the first database. The snapshot times cause all subsequent reads of the first database by the plurality of processes to return data from the first database as of the snapshot times.

41 Claims, 10 Drawing Sheets

FIG. 2A

DATABASE 204

T0 — DB_A

T1 — DB_B

T2 — DB_C

T3 — DB_D

T4 — DB_E

T5 — DB_F

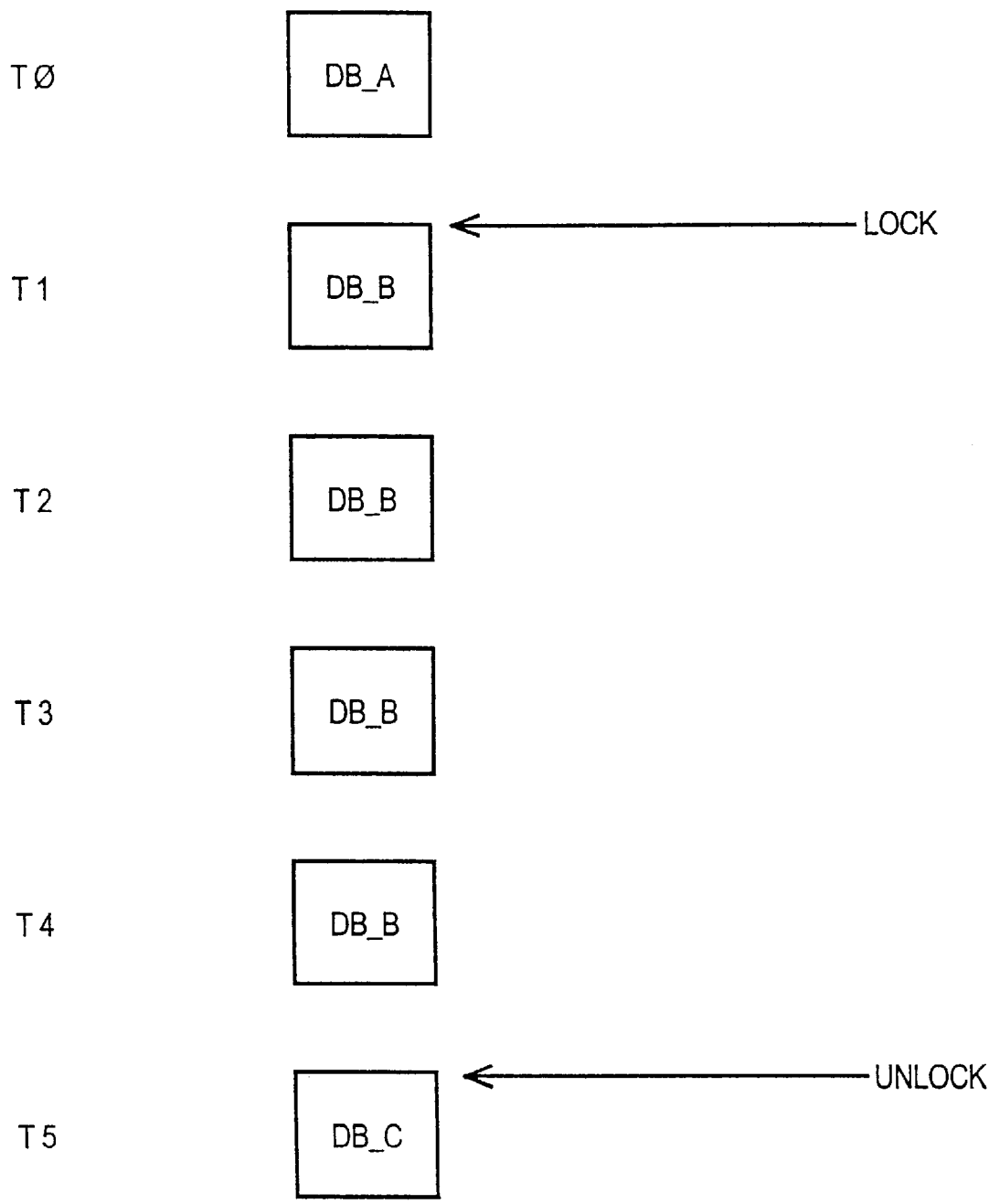

METHOD AND APPARATUS FOR COPYING DATA THAT RESIDES IN A DATABASE

FIELD OF THE INVENTION

The present invention relates to the copying of data and more specifically to producing a copy of data that resides in a database.

BACKGROUND OF THE INVENTION

Planning software is used by manufacturers to aid in the manufacturing process. Based upon the desired product output and the components needed for each product, the planning software generates a schedule of what components need to be manufactured and by when, and what materials need to be procured and by when. This schedule is generated based upon data stored in a database. The planning process is often complicated and, for complex products, can take many hours to complete.

A typical requirement imposed by the planning software is that it needs to do its processing based on a single consistent version of the database. If one process of the planning software is reading one version of the database while another process is reading an updated version of the database, serious errors, such as double counting, can occur. As a result, planning software requires that data be provided from a single frozen version of the database in order to operate properly.

As is well known, a database or a selected subset thereof can be frozen by obtaining exclusive locks on all of the tables in the database or the selective subset. Once locked, the tables can be processed by the planning software to carry out the planning process. However, as noted above, the planning process can take many hours to complete. Many companies, especially those having offices around the world, cannot afford to lock their tables for extended periods of time. Hence, locking tables in this manner is often not a viable solution.

Another possible solution is to simply make a copy of the database prior to running the planning software. The problem with this solution is that for large databases, the copying process itself can take several hours. During this time, the tables need to be locked to ensure a frozen state. As long as the tables are locked, no updates can be made. Hence, this solution suffers from the same shortcomings, albeit to a lesser degree, as the locking solution.

Based on the foregoing, it is clearly desirable to provide a mechanism for obtaining a single frozen version of the database, or a subset thereof, without locking tables in the database for an extended period of time.

SUMMARY OF THE INVENTION

According to one aspect of the invention, a method and apparatus for supplying a consistent set of data to a software application is provided.

According to the method, a software application is launched that requires a particular set of data contained in a first database. Once the particular set of data is identified, a first process is requested to obtain a snapshot time from a database server associated with the first database. The snapshot time causes all subsequent reads of the first database by the first process to return data that reflects a database state associated with the snapshot time. After the first process obtains the snapshot time, the first process extracts the particular set of data from the first database. The software application is then supplied with the particular set of data that was extracted from the first database.

In one embodiment, a second process is used to store the particular set of data that was extracted into a second database.

According to another aspect of the invention, a method and apparatus for producing a copy of data from a first database is provided.

According to the method, a first set of data in the first database is locked. After locking the first set of data, a plurality of processes are requested to obtain snapshot times from a database server associated with said first database. The snapshot times cause all subsequent reads of the first database by the plurality of processes to return data from the first database as of the snapshot times. After waiting a particular period of time for the plurality of processes to be assigned snapshot times, the locks on the first set of data in the first database are released.

The plurality of processes that were successful in obtaining a snapshot time within the particular period of time are used to extract a copy of the first set of data from the first database. The copy of the first set of data is then separately stored from the first of data.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A illustrates the use of a snapshot time in accordance with an embodiment of the invention;

FIG. 2B illustrates the locking a database to obtain snapshot times that correspond to a single database state;

DETAILED DESCRIPTION OF THE PREFERRED EMBODIMENT

A method and apparatus for producing a consistent copy of a database, or portion thereof, is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1:
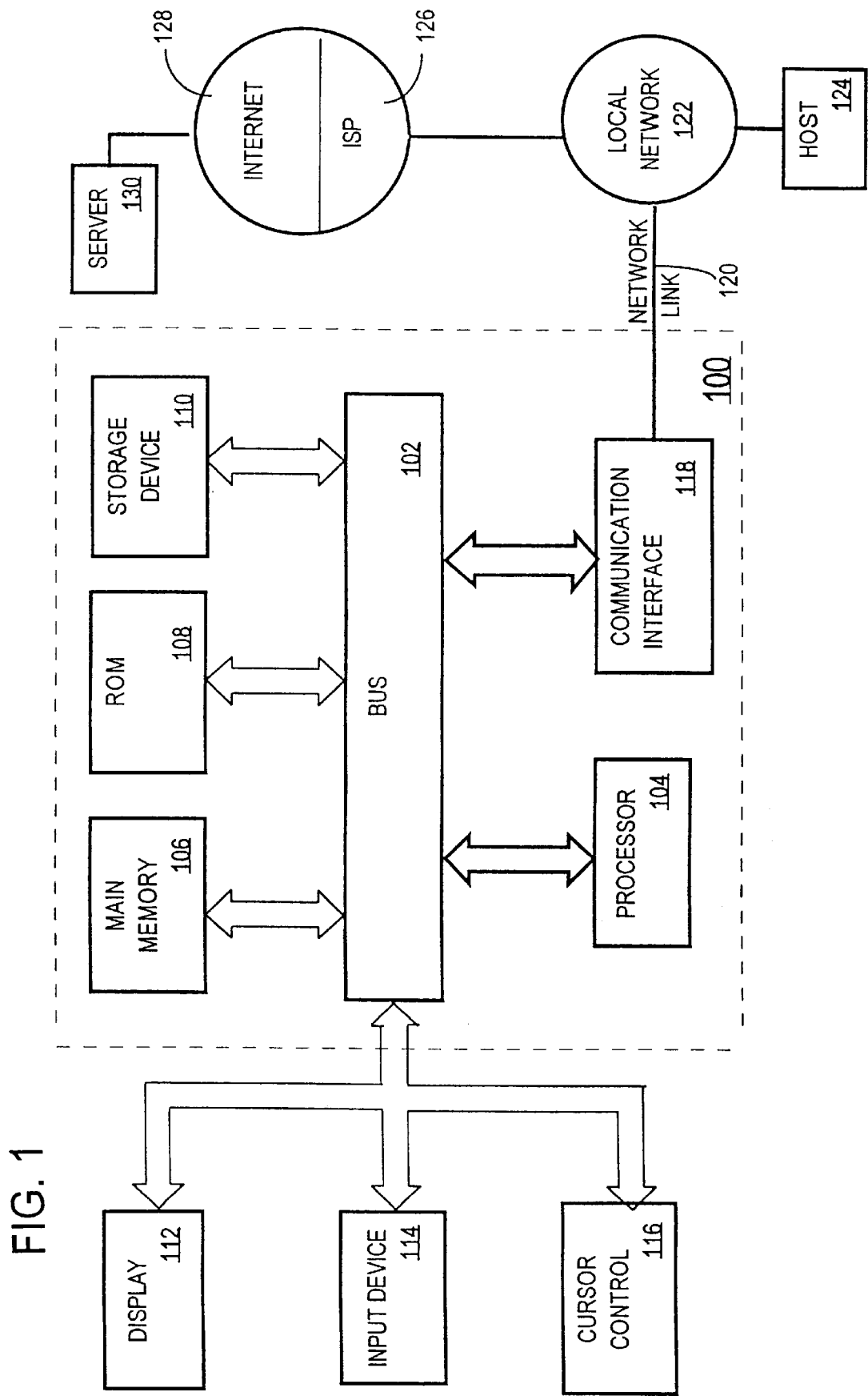
FIG. 1 is a block diagram of a system that may be programmed to implement the present invention.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for producing a copy of a database. According to one embodiment of the invention, a copy of a database is produced by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CDROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application provides for producing a copy of a database as described herein.

The received code may be executed by processor 104 as it is received, and/or stored in storage device 110, or other non-volatile storage for later execution. In this manner, computer system 100 may obtain application code in the form of a carrier wave.

Functional Overview

The present invention provides a mechanism for producing a consistent copy of a database, or portion thereof, without locking the database or desired portion for an extended period of time. For the purpose of explanation, embodiments of the invention shall be described with reference to a relational database that stores data in tables. The database portion of which a consistent copy is required is therefore referred to herein as the "desired tables". However, the techniques described herein are not limited to tables or relational databases.

In one embodiment, the following steps are performed to obtain a snapshot (consistent copy) of a database:

(1) the desired tables (e.g. the tables that contain information required by a memory-based planner) are identified;

(2) the desired tables are locked to prevent them from being updated;

(3) a coordinator requests a plurality of snapshot worker processes to obtain snapshot times, where the snapshot times allow the snapshot workers to obtain data from the database as of a particular state of the database;

(4) the coordinator then waits a certain period of time for the requested plurality of snapshot workers to obtain snapshot times;

(5) the coordinator then releases the locks on the desired tables;

(6) using the snapshot workers that obtained a snapshot time before the locks were released (the "successful snapshot workers"), a copy of the desired tables is produced which represents the state of the database at the time desired tables were locked.

System Overview

Figure 2:
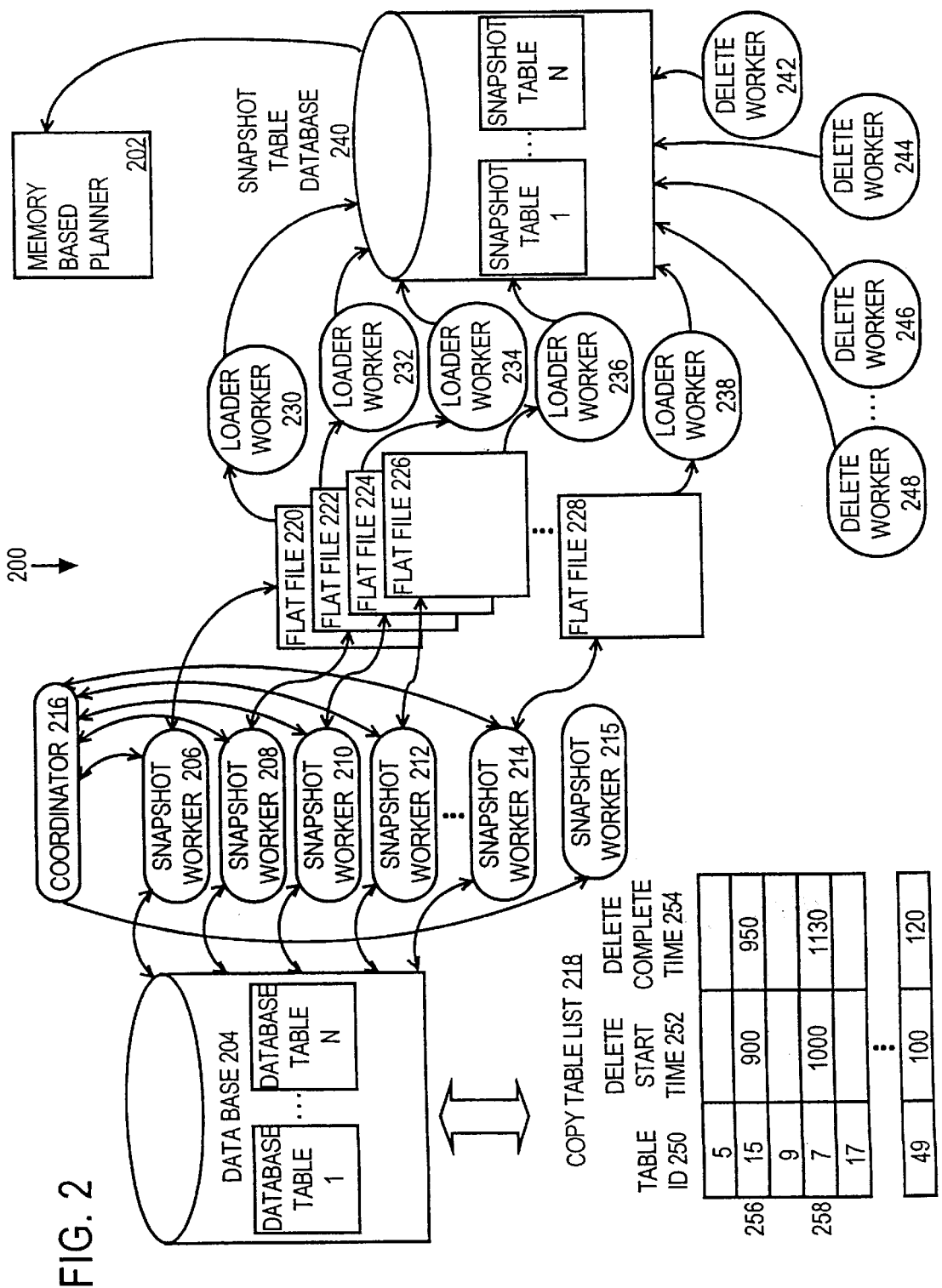
FIG. 2 is a block diagram of a system that is used for producing a copy of a database in accordance with an embodiment of the present invention.

FIG. 2 depicts a block diagram of a system 200 that is used for producing a copy of desired tables in accordance with an embodiment of the present invention.

As depicted in FIG. 2, a memory based planner 202 has been launched by a user to generate a planning schedule that is based upon a snapshot of database 204. Typically, generation of a planning schedule will only require data from a subset of the tables contained in database 204. Therefore, a copy table list 218 is maintained which lists the database tables (1..N) in database 204 that are required in the generation of the planning schedule (the "desired tables").

A coordinator 216 interfaces with individual worker processes, snapshot workers (206–214), loader workers (230–238) and delete workers(242–248), and is responsible for the overall coordination of producing a copy of database 204 for use in generation of the planning schedule.

Operation of System 200

To produce a snapshot of database 204, data copy table 218 is generated which identifies the desired set of data tables (1..N) in database 204. The desired set of tables listed in data copy table 218 are the tables that contain information that is needed by the memory based planner 202 in order to generate the planning schedule. Using the information contained in the data copy table 218, the coordinator 216 locks each desired table (1..N). The locks thus obtained prevent other processes from modifying the desired tables (1..N).

Once the locks are obtained, the coordinator 216 requests a plurality of snapshot workers (206, 208, 210, 212, 214 and 215) to obtain a snapshot time from the database management system (DBMS). Snapshot times are assigned by the database management system, and are used by the database management system to determine what version of data to supply to processes. For example, the version of data items that are supplied to a process assigned a snapshot time of Ti will reflect the state of those data items as of time T1, even if the data items have been subsequently modified.

Snapshot times are used to guarantee that a particular version of data is given to a process (i.e. snapshot worker). Thus, if a process requests data that has been modified since obtaining its snapshot time, the DBMS reconstructs the state of data as of the snapshot time and supplies the reconstructed data to the process.

For example, FIG. 2A illustrates the use of a snapshot time in accordance with an embodiment of the invention. In FIG. 2A, DB_A, DB_B, DB_C, DB_D, DB_E and DB_F respectively represent different states of database 204 at time T0, T1, T2, T3, T4 and T5. If a snapshot time is issued at time T0 and a read is subsequently performed at time T3, the DBMS will respond to the read by returning data as it existed in the database as of time T0 (i.e. DB_A). The DBMS may achieve this using a variety of mechanisms. According to one embodiment, the DBMS uses log entries to reconstruct the state of the requested data items to reflect their state at time T0. In effect, the snapshot time enables a process to see a snapshot of a database as of a particular time.

One mechanism by which a DBMS can reconstruct a particular state of the database is described in detail in U.S Patent Applications "Method and Apparatus for Providing Isolation Levels in a Database", having Ser. No. 08/613,026, filed Mar. 11, 1996; "Techniques for Providing the Number of Snapshots of a Database", having Ser. No. 08/838,967, filed Apr. 23, 1997, and "Dynamic Snapshot Set Adjustment", having Ser. No. 08/841,541, filed Apr. 23, 1997, which are hereby incorporated by reference.

After the coordinator 216 requests the plurality of snapshot workers (206, 208, 210, 212, 214 and 215) to obtain snapshot times, it then waits for a certain period of time (T_WAIT) for the snapshot times to be assigned to the snapshot workers by the DBMS. The snapshot times that the DBMS assigns to the snapshot workers approximately reflect the times at which the snapshot time assignments are made. Since the snapshot times are being assigned after the desired tables are locked, and before the locks on the desired tables are released, the snapshot times assigned to the snapshot workers will correspond to a time at which the desired tables were locked.

In certain embodiments, the snapshot workers obtain snapshot times by executing a "set transaction read only" command. Once a process issues a "set transaction read only" command to the DBMS, that process is ensured by the DBMS that all subsequent reads by that process for that transaction will return data that was in the database as of the time the "set transaction read only" command was issued.

In certain database systems, using the "set transaction read only" command has certain limitations. Specifically, the process that issued the command cannot perform any database modifications (defined as any inserts, updates, or deletes). If it does perform database modifications, it loses the benefits of the command (i.e. loses its snapshot time). Because of this, it is not possible to use the "set transaction read only" command with a transaction that makes copies within a database of the relevant tables (since copying would involve writing into a database).

To circumvent this problem, the successful snapshot workers read the data from the database, and then write the data to one or more flat files outside of the database. Because writing to a flat file is an operating system command, and not a DBMS command, it does not constitute a "write" operation as far as the DBMS is concerned. Hence, the snapshot times obtained through the "set transaction read only" command remains in effect for each snapshot worker.

When the (T_WAIT) time period expires, the coordinator 216 releases its locks on the tables. At this time, some of the snapshot workers that were requested to obtain snapshot times may not yet have been assigned snapshot times. To ensure that all processes that participate in the creation of copies of the relevant tables are seeing the same version of the relevant tables, only those snapshot workers that have been assigned snapshot times prior to the expiration of T_WAIT (the "successful snapshot workers") are used in retrieving data from database 204. For the purpose of explanation, it shall be assumed that snapshot workers 206–214 successfully obtained snapshot times, and that snapshot worker 215 did not.

Because the tables identified in the copy table list 218 were locked at the time the successful snapshot workers were assigned their snapshot times, the successful snapshot workers are guaranteed that when they retrieve data from the desired table, they will retrieve data which corresponds to a single database state.

For example, FIG. 2B illustrates locking database 204 to obtain snapshot times that correspond to a single database state in accordance with an embodiment of the invention. In FIG. 2B, DB_A, DB_B and DB_C represent different states of the relevant tables within database 204. In this example, the desired tables in database 204 are locked by coordinator 216 at time T1 for a T_WAIT period of "4", and, therefore cannot be updated by another process until T5. The coordinator 216 maintains its locks on the desired tables in database 204 until T5. Thus, if snapshot workers 206, 208 and 210 obtain snapshot times at T1, T3 and T4, they will all retrieve data which corresponds to a single database state (DB_B) from the desired tables.

In one embodiment, the successful snapshot workers are not required to wait until the end of the T_WAIT period of time before they begin to retrieve data from database 204. For example, referring to FIG. 2B, if a snapshot worker obtains a snapshot time at T2, the snapshot worker may begin to retrieve data from the desired tables before the tables are unlocked at T5.

Using the snapshot times, the successful snapshot workers (206, 208, 210, 212 and 214) retrieve data from database 204 and copy it into a plurality of flat files (220, 22, 224, 226 and 228). The coordinator 216 is responsible for coordinating the particular data (i.e. the tables identified in data copy table 218) that is retrieved by each of the successful snapshot workers (206, 208, 210, 212 and 214).

When any flat file of the plurality of flat files (220, 22, 224, 226 and 228) has been completed, one of a plurality of loader workers (230, 232, 234, 236 and 238) load the flat files into one of a plurality of snapshot tables (1..N) in snapshot table database 240. The plurality of snapshot tables (1..N) in snapshot table database 240 are mapped on a one-to-one basis with the desired database tables (1..N) in database 204. In certain embodiments, the loader workers are SQL loaders that write data from the flat files directly into the snapshot tables (1..N) in the snapshot table database 240.

Before the data from a flat file thus created can be loaded into a particular snapshot table in snapshot table database 240, any data that was previously stored in the particular snapshot table (i.e. "stale data" from a prior execution of the planning software process 202) must first be removed. To perform this task, a plurality of delete workers (242, 244, 246 and 248) are used to delete previously stored snapshot tables from snapshot table database 240.

Once the previously stored snapshot tables are deleted and the flat files are loaded into the snapshot tables in the snapshot table database 240, snapshot table database 240 contains a consistent snapshot of the desired tables identified in data copy table 218 as of a particular point in time.

In a preferred embodiment, once the desired tables are copied into the flat files, the memory based planner 202 reads the flat file information to generate a planning schedule. In an alternative embodiment, the memory based planner 202 waits for the flat files to be copied into the snapshot tables in snapshot table database 240 and then reads the snapshot table information to generate a planning schedule.

Sequence for Producing a Copy of a Database

Figure 3A:
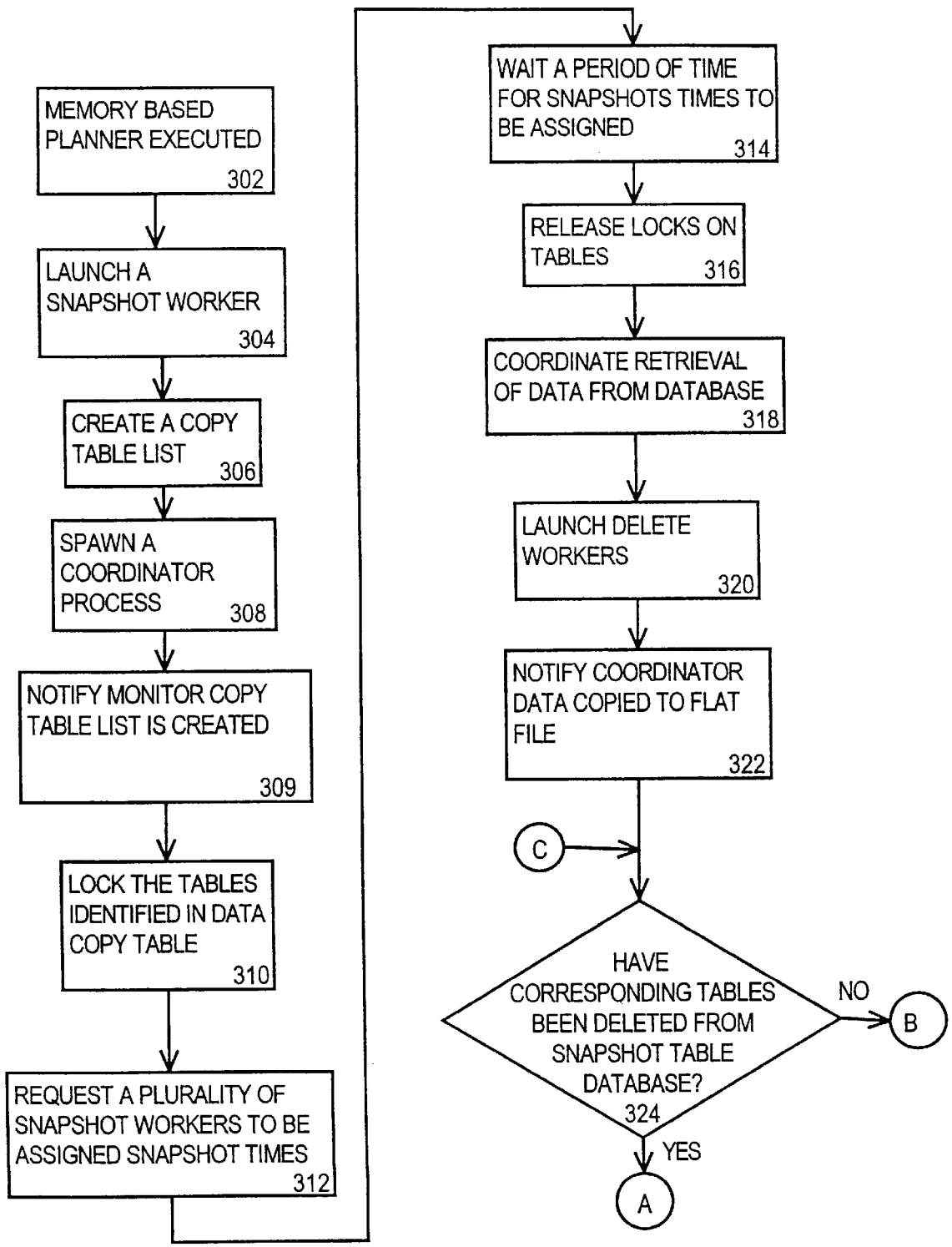
FIG. 3A is a portion of a flow diagram illustrating a method for producing a copy of a database without retaining a lock on the database tables according to an embodiment of the invention.
Figure 3B:
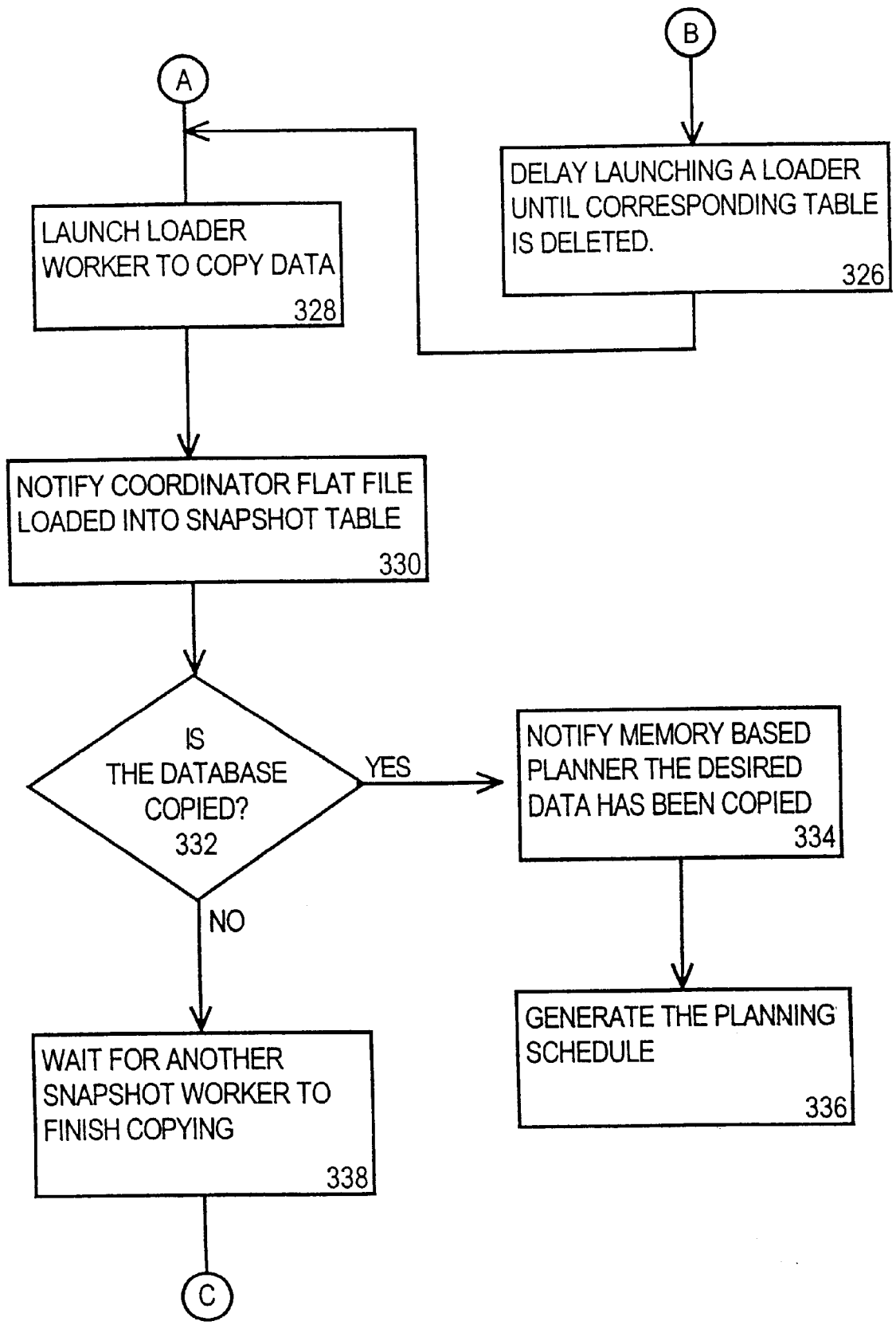
FIG. 3B is another portion of a flow diagram illustrating a method for producing a copy of a database without retaining a lock on the database tables according to an embodiment of the invention.

FIG. 3A and 3B are flow diagrams illustrating a method for producing a copy of desired data from database 204 according to an embodiment of the invention. For explanation purposes, the flow diagrams of FIGS. 3A and 3B are described with reference to the components of FIG. 2.

At step 302, a memory based planner 202 is executed by a user to generate a planning schedule that is based upon data from database 204. At step 304, the memory based planner 202 causes a snapshot worker 206 to be launched.

At step 306, the snapshot worker 206 determines which tables of database 204 are required by the memory based planner 202 for generating the planning schedule. Using this information, the snapshot worker 206 generates a copy table list 218.

In one embodiment, each entry in the copy table list 218 includes a table ID 250, a delete start time 252 and a delete complete time 254. The table ID 250 identifies a particular table in database 204 that is required by the memory based planner 202 for the generation of the planing schedule. The delete start time 252 identifies a system timestamp in which a delete worker began to delete a corresponding snapshot table (to remove "stale data") in snapshot table database 240, as identified by the particular table ID. For example, entry 256 of copy table list 218 indicates that a delete worker began to delete snapshot table 15 in snapshot table database 240 at the system time of 900.

The delete complete time 254 identifies a system timestamp in which a delete worker completed the deletion of a snapshot table in snapshot table database 240, as identified by the particular table ID. For example, entry 256 of copy table list 218 indicates that a delete worker completed the deletion of snapshot table 15 in snapshot table database 240 at the system time of 950. The delete start time 252 and delete complete time 254 entries are used by the coordinator 216 to determine whether data can be loaded into a particular snapshot table (1..N).

At step 308, the snapshot worker 206 spawns a coordinator process 216 for coordinating the copying of data from database 204. At step 309, the snapshot worker 206 notifies the coordinator 216 that the copy table list 218 has been created. At step 310, the coordinator 216 obtains locks on the tables identified in the copy table list 218.

At step 312, after obtaining a lock on each table identified in copy table list 218, the coordinator 216 requests a plurality of snapshot workers (206–214) to solicit snapshot times from the DBMS. In one embodiment, upon executing a memory based planner, the user may specify a particular number of snapshot workers for the coordinator 216 to request to solicit snapshot times.

At step 314, the coordinator waits a certain period of time (T_WAIT) for the requested snapshot workers (206–214) to be assigned snapshot times. For example, in one embodiment, the coordinator 216 waits several minutes after requesting the plurality of snapshot workers (206–214) to solicit snapshot times from the DBMS.

At step 316, after the (T_WAIT) period of time expires, the coordinator releases the locks on the tables identified in copy table list 218.

At step 318, the coordinator 216 uses the copy table list 218 to assign the successful snapshot workers (in this example, snapshot workers 206–214), a particular set of data to copy from database 204. For example, snapshot worker 206 may be assigned to copy database table "17" from database 204. Once assigned a set of data, the successful snapshot workers (206–214) begin to copy the assigned data from database 204 into flat files (220–228).

In certain embodiments, the coordinator 216 assigns the snapshot workers a particular set of data to copy before the (T_WAIT) period of time expires. For example, the coordinator could assign a particular copying task at the same time that the coordinator requests the snapshot workers to obtain snapshot times. Without waiting to the T_WAIT period to expire, each snapshot worker can begin the copying task as soon as (1) it is assigned the set of data copy, and (2) it has successfully obtained a snapshot time.

At step 320, the coordinator launches delete workers (242–248) to delete "stale data" contained in the snapshot tables in snapshot table database 240. In deleting the "stale data", the delete workers use the copy table list 218 to identify which snapshot tables in snapshot table database 240 need to be deleted. In one embodiment, the delete workers (242–248) respectively update the delete start time 252 and delete complete time 254 parameters for the corresponding entry as they begin and complete the deletion of a particular table identified in copy table list 218.

For example, the delete worker 242 may use the information at entry 258 of copy table list 218 to identify a snapshot table "7" in snapshot table database 240 as a table that needs to be deleted. The delete worker 242 then stores the current system time ("1000" in this example) in the delete start time 252 parameter of entry 258 and begins deleting the snapshot table "7". When delete worker 242 completes the deletion of snapshot table "7", it stores the current system time ("1130" in this example) in the delete complete time 254 parameter of entry 258.

It should be noted that although the delete workers (242–248) are launched at step 320 in this example, the coordinator 216 may actually launch them prior to or even after step 320. For example, in one embodiment, the coordinator 216 launches the delete workers (242–248) immediately after it is notified that the copy table list 218 has been created in step 308.

At step 322, a snapshot worker notifies the coordinator 216 it has finished copying the data it was assigned. In one embodiment, the snapshot worker informs the coordinator 216 of the data that was copied (i.e. the particular database tables in database 204) and the location of the one or more flat files that contains the copy of the data. Although FIG. 2 depicts each snapshot worker using a single flat file for copying its assigned data, in certain embodiments, the snapshot workers may copy their assigned data to multiple flat files, informing the coordinator 216 each time one of the flat files has been completed.

At step 324, the coordinator 216 determines whether the delete workers (242–248) have deleted the snapshot tables (i.e. "stale data") in the snapshot table database 240 that correspond to the data that the snapshot worker has just completed copying. For example, if the snapshot worker informs the coordinator 216 that database tables "1", "5", and "8" in database 204 have just been copied to the flat file 222, the coordinator 216 determines whether the delete workers (242–248) have removed the "stale data" by deleting snapshot tables "1", "5" and "8" in snapshot table database 240.

In certain embodiments, the coordinator 216 uses the information in the copy table list 218 to determine if a particular snapshot table has been deleted. In one embodiment, the coordinator 216 uses the delete complete time 254 parameter to determine if a snapshot table has been deleted.

If at step 324 the coordinator 216 determines that a snapshot table has not been deleted (i.e. snapshot tables "1", "5" and "8" for the previous example), then at step 326, the coordinator 216 delays the launching (e.g. spawning) of a loader worker (230–238) for loading the information until the snapshot tables "1", "5" and "8" have been deleted. For example, assuming that snapshot worker 206 has notified coordinator 216 that it has copied database tables "1", "5" and "8" from database 204 into flat file 220, if coordinator 216 determines that snapshot table "5" in snapshot table database 240 has not been deleted (i.e. the "stale data" has not been removed), then coordinator 216 will delay launching loader worker 230 for loading the information into snapshot tables "1", "5" and "8", until snapshot table "5" has been deleted. Control then proceeds to step 338.

If at step 324, the coordinator 216 determines that the snapshot table has been deleted, then at step 328 the coordinator 216 launches a loader worker (230–238) to load the information from the flat file into the corresponding snapshot table in snapshot table database 240.

At step 330, when a loader worker (230–238) finishes loading a flat file (220–228) into its corresponding snapshot file in snapshot table database 240, it notifies the coordinator 216. In certain embodiments, the loader workers (230–238) notify the coordinator 216 of the particular snapshot table in which the data was loaded.

At step 332, the coordinator 216 determines whether all the desired tables identified in copy table list 218 have been copied from database 204 into the flat files (220–228).

If at step 332 the coordinator 216 determines that all the tables identified in copy table list 218 have been copied, then at step 334, the coordinator 216 notifies the memory based planner 202 that the flat files (220–228) contain a valid copy of the desired tables from database 204. At step 336, the memory based planner 202 uses the information in the flat files (220–228) to generate the planning schedule.

In an alternative embodiment, at step 332, the coordinator 216 determines whether all the desired tables identified in copy table list 218 have been copied from database 204 into the snapshot tables in snapshot table database 240. If the coordinator 216 determines that all the tables identified in copy table list 218 have been copied, then at step 334, the coordinator 216 notifies the memory based planner 202 that the snapshot table database 240 contains a valid copy of the desired tables from database 204. At step 336, the memory based planner 202 then uses the snapshot tables in snapshot table database 240 to generate the planning schedule.

If at step 332 the coordinator 216 determines that all the tables identified in copy table list 218 have not been copied, then at step 338, the coordinator 216 continues to accept and process other completion notifications from snapshot workers (206–214). When the coordinator 216 receives a notification that a snapshot worker (206–214) has finished copying its assigned data to a particular flat file, control proceeds to step 324 to determine whether the delete workers (242–248) have deleted the corresponding snapshot tables in the snapshot table database 240.

Producing a Copy without Locking Database Tables

In the embodiment described above, the desired tables are locked for a relatively brief period T_WAIT while snapshot workers obtain snapshot times. In an alternative embodiment, a mechanism is provided for producing a copy of desired tables from a database without locking the desired tables. For example, in one embodiment, the following steps are performed to obtain a snapshot of a database without locking the desired tables:

(1) the desired tables are identified;

(2) a single snapshot worker process is requested to obtain a snapshot time;

(3) using the single snapshot worker, a copy of desired tables is produced which reflects the state of the database associated with the snapshot time.

Figure 4:
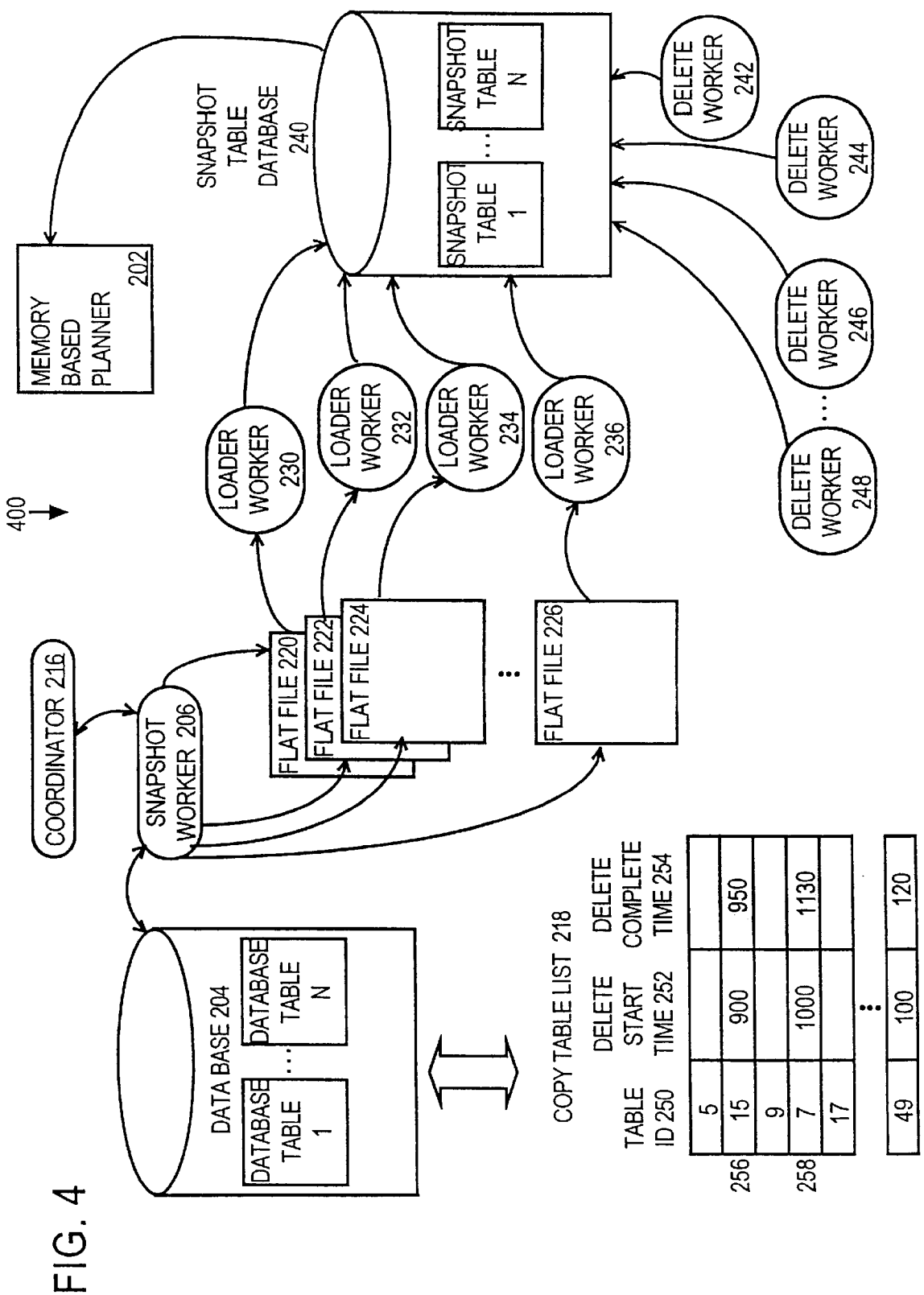
FIG. 4 is a block diagram of a system that is used for producing a copy of a database in accordance with an embodiment of the present invention.

FIG. 4 depicts a block diagram of a system 400 that is used for producing a copy of a database in accordance with an embodiment of the present invention. FIG. 4 is similar to FIG. 2, and therefore like components have been numbered alike.

The system 400 differs from that shown in FIG. 2 in that system 400 includes a single snapshot worker 206 which is used to retrieve data from database 204. By using a single snapshot worker 206, only a single snapshot time is required. Because only a single snapshot time is required, the coordinator 216 is not required to lock the database tables in database 204.

Figure 5A:
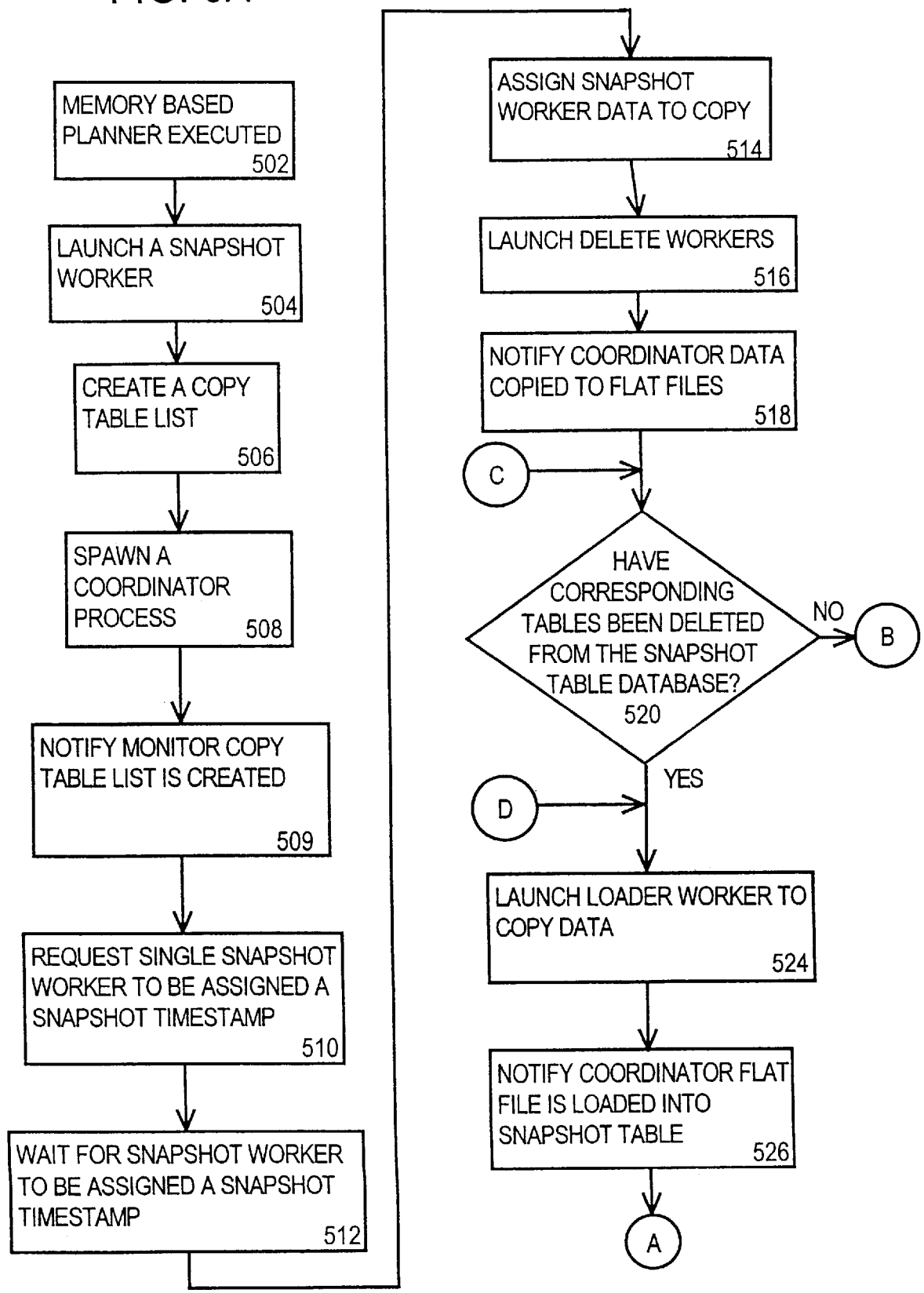
FIG. 5A is a portion of a flow diagram illustrating a method for producing a copy of a database without locking the database tables.
Figure 5B:
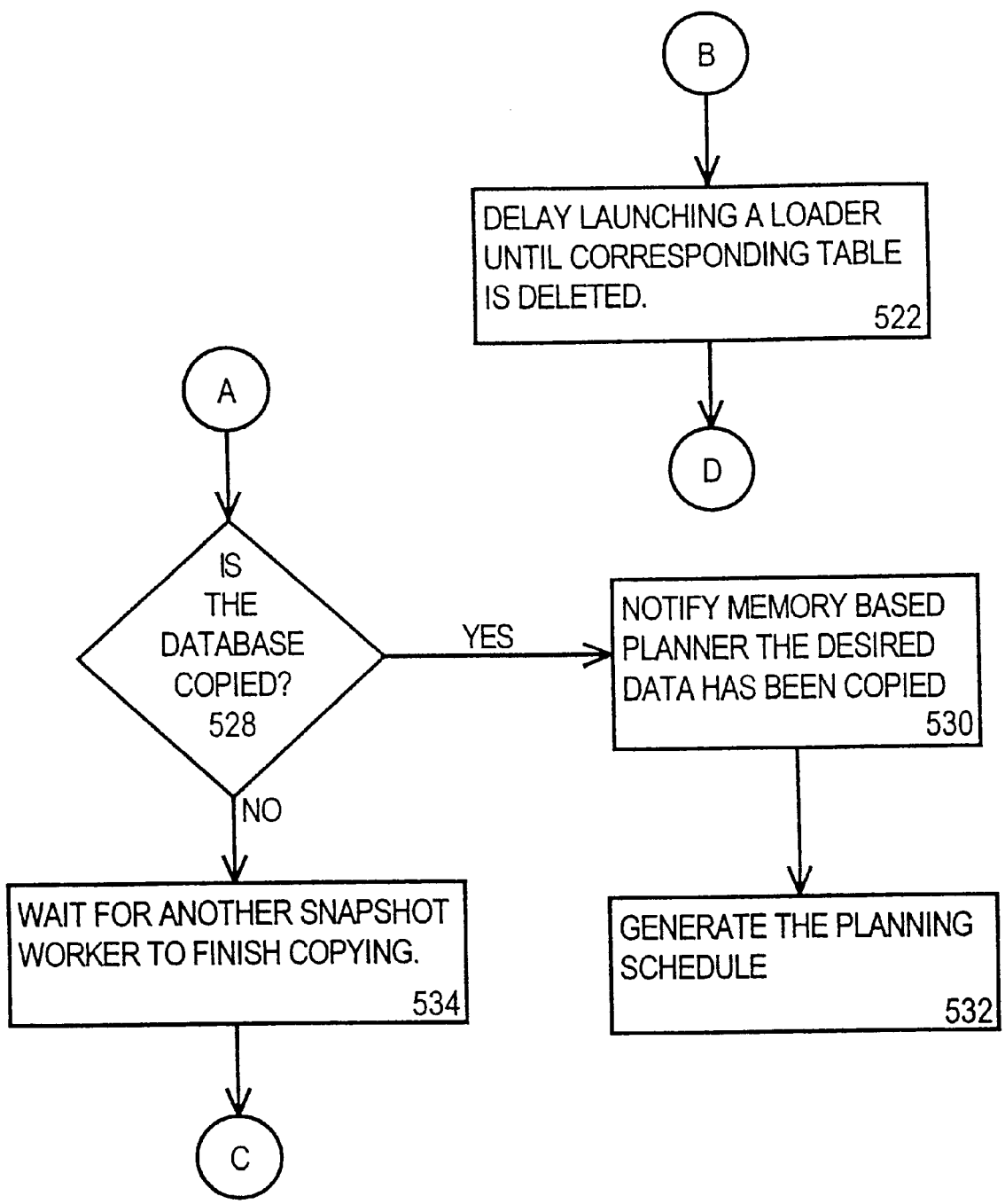
FIG. 5B is another portion of a flow diagram illustrating a method for producing a copy of a database without locking the database tables.

FIG. 5A and 5B are flow diagrams illustrating a method for producing a copy of desired data from database 204, without locking the database tables that contain the desired data, according to an embodiment of the invention. For explanation purposes, the flow diagrams of FIGS. 5A and 5B are described with reference to the components of FIG. 4.

At step 502, a memory based planner 202 is executed by a user to generate a planning schedule that is based upon data from database 204. At step 504, the memory based planner 202 causes a snapshot worker 206 to be launched.

At step 506, the snapshot worker 206 determines which tables of database 204 are required by the memory based planner 202 for generating the planning schedule. Using this information, the snapshot worker 206 generates a copy table list 218.

In one embodiment, each entry in the copy table list 218 includes a table ID 250, a delete start time 252 and a delete complete time 254. The table ID 250 identifies a particular table in database 204 that is required by the memory based planner 202 for the generation of the planing schedule. The delete start time 252 identifies a system time stamp in which a delete worker began to delete a corresponding snapshot table (to remove "stale data") in snapshot table database 240, as identified by the particular table ID. For example, entry 256 of copy table list 218 indicates that a delete worker began to delete snapshot table 15 in snapshot table database 240 at the system time of 900.

The delete complete time 254 identifies a system time stamp in which a delete worker completed the deletion of a snapshot table in snapshot table database 240, as identified by the particular table ID. For example, entry 256 of copy table list 218 indicates that a delete worker completed the deletion of snapshot table 15 in snapshot table database 240 at the system time of 950. The delete start time 252 and delete complete time 254 entries are used by the coordinator 216 to determine whether data can be loaded into a particular snapshot table (1..N).

At step 508, the snapshot worker 206 spawns a coordinator process 216 for coordinating the copying of data from database 204. At step 509, the snapshot worker 206 notifies the coordinator 216 that the copy table list 218 has been created.

At step 510, the coordinator 216 requests the snapshot workers 206 to solicit a snapshot times from the DBMS.

At step 512, the coordinator waits for the snapshot worker 206 to be assigned a snapshot time.

At step 514, the coordinator 216 uses the copy table list 218 to assign the snapshot worker 206, a particular set of data to copy from database 204. For example, snapshot worker 206 may be assigned to copy database table "17" from database 204. Once assigned a set of data, the snapshot worker 206 begins to copy the assigned data from database 204 into flat files (220–226).

At step 516, the coordinator launches delete workers (242–248) to delete "stale data" contained in the snapshot tables in snapshot table database 240. In deleting the "stale data", the delete workers use the copy table list 218 to identify which snapshot tables in snapshot table database 240 need to be deleted. In one embodiment, the delete workers (242–248) respectively update the delete start time 252 and delete complete time 254 parameters for the corresponding entry as they begin and complete the deletion of a particular table identified in copy table list 218.

For example, the delete worker 242 may use the information at entry 258 of copy table list 218 to identify a snapshot table "7" in snapshot table database 240 as a table that needs to be deleted. The delete worker 242 then stores the current system time ("1000" in this example) in the delete start time 252 parameter of entry 258 and begins deleting the snapshot table "7". When delete worker 242 completes the deletion of snapshot table "7", it stores the current system time ("1130" in this example) in the delete complete time 254 parameter of entry 258.

It should be noted that although the delete workers (242–248) are launched at step 516 in this example, the coordinator 216 may actually launch them prior to or even after step 516. For example, in one embodiment, the coordinator 216 launches the delete workers (242–248) immediately after it is notified that the copy table list 218 has been created in step 508.

At step 518, the snapshot worker 206 notifies the coordinator 216 it has finished copying the data it was assigned. In one embodiment, the snapshot worker informs the coordinator 216 of the data that was copied (i.e. the particular database tables in database 204) and the location of the one or more flat files that contains the copied data. As illustrated by flat files (220–226), snapshot worker 206 may copy its assigned data to multiple flat files, informing the coordinator 216 each time one of the flat files has been completed.

At step 520, the coordinator 216 determines whether the delete workers (242–248) have deleted the snapshot tables (i.e. removed the "stale data") in the snapshot table database 240 that correspond to the data that the snapshot worker has just completed copying. For example, if the snapshot worker 206 informs the coordinator 216 that database tables "1", "5", and "8" in database 204 have just been respectively copied to the flat files 222, 224 and 226, the coordinator 216 determines whether the delete workers (242–248) have deleted snapshot tables "1", "5" and "8" in snapshot table database 240, thereby removing the "stale data".

In certain embodiments, the coordinator 216 uses the information in the copy table list 218 to determine if a particular snapshot table has been deleted. In one embodiment, the coordinator 216 uses the delete complete time 254 parameter to determine if a snapshot table has been deleted.

If at step 520 the coordinator 216 determines that a snapshot table has not been deleted (i.e. snapshot tables "1", "5" and "8" for the previous example), then at step 522, the coordinator 216 delays the launching (e.g. spawning) of a loader worker (230–238) for loading the information until the snapshot tables "1", "5" and "8" have been deleted. For example, assuming that snapshot worker 206 has notified coordinator 216 that it has copied database tables "1", "5" and "8" from database 204 into flat file 220, if coordinator 216 determines that snapshot table "5" in snapshot table database 240 has not been deleted (i.e. the "stale data" has not been removed), then coordinator 216 will delay launching loader worker 230 for loading the information into snapshot tables "1", "5" and "8", until snapshot table "5" has been deleted. Control then proceeds to step 534.

If at step 520, the coordinator 216 determines that the snapshot table has been deleted, then at step 524 the coordinator 216 launches a loader worker (230–238) to load the information from the flat file into the corresponding snapshot table in snapshot table database 240.

At step 526, when a loader worker (230–238) finishes loading a flat file (220–228) into its corresponding snapshot file in snapshot table database 240, it notifies the coordinator 216. In certain embodiments, the loader workers (230–238) notify the coordinator 216 of the particular snapshot table in which the data was loaded.

At step 528, the coordinator 216 determines whether all the desired tables identified in copy table list 218 have been copied from database 204 into the snapshot tables in snapshot table database 240.

If at step 528 the coordinator 216 determines that all the tables identified in copy table list 218 have been copied, then at step 530, the coordinator 216 notifies the memory based planner 202 that the snapshot table database 240 contains a valid copy of the desired tables from database 204. At step 532, the memory based planner 202 uses the snapshot tables in snapshot table database 240 to generate the planning schedule.

Conversely, if at step 528 the coordinator 216 determines that all the tables identified in copy table list 218 have not been copied, then at step 534, the coordinator 216 continues to accept and process other completion notifications from snapshot workers (206–214). When the coordinator 216 receives a notification that a snapshot worker (206–214) has finished copying its assigned data to a particular flat file, control proceeds to step 520 to determine whether the delete workers (242–248) have deleted the corresponding snapshot tables in the snapshot table database 240.

Copying Data Directly Into Another Database

Certain database systems provide snapshot mechanisms for transactions that modify the database, as well as for "read only" transactions. Such a mechanism is described in U.S. patent application Ser. No. 08/613,026, filed Mar. 11, 1996, Entitled "Method and Apparatus for Providing Isolation Levels in a Data", the contents of which are incorporated herein by this reference. In certain embodiments, such a snapshot mechanism is used to allow the snapshot workers to copy the desired tables into a database without the use of flat files.

Figure 6:
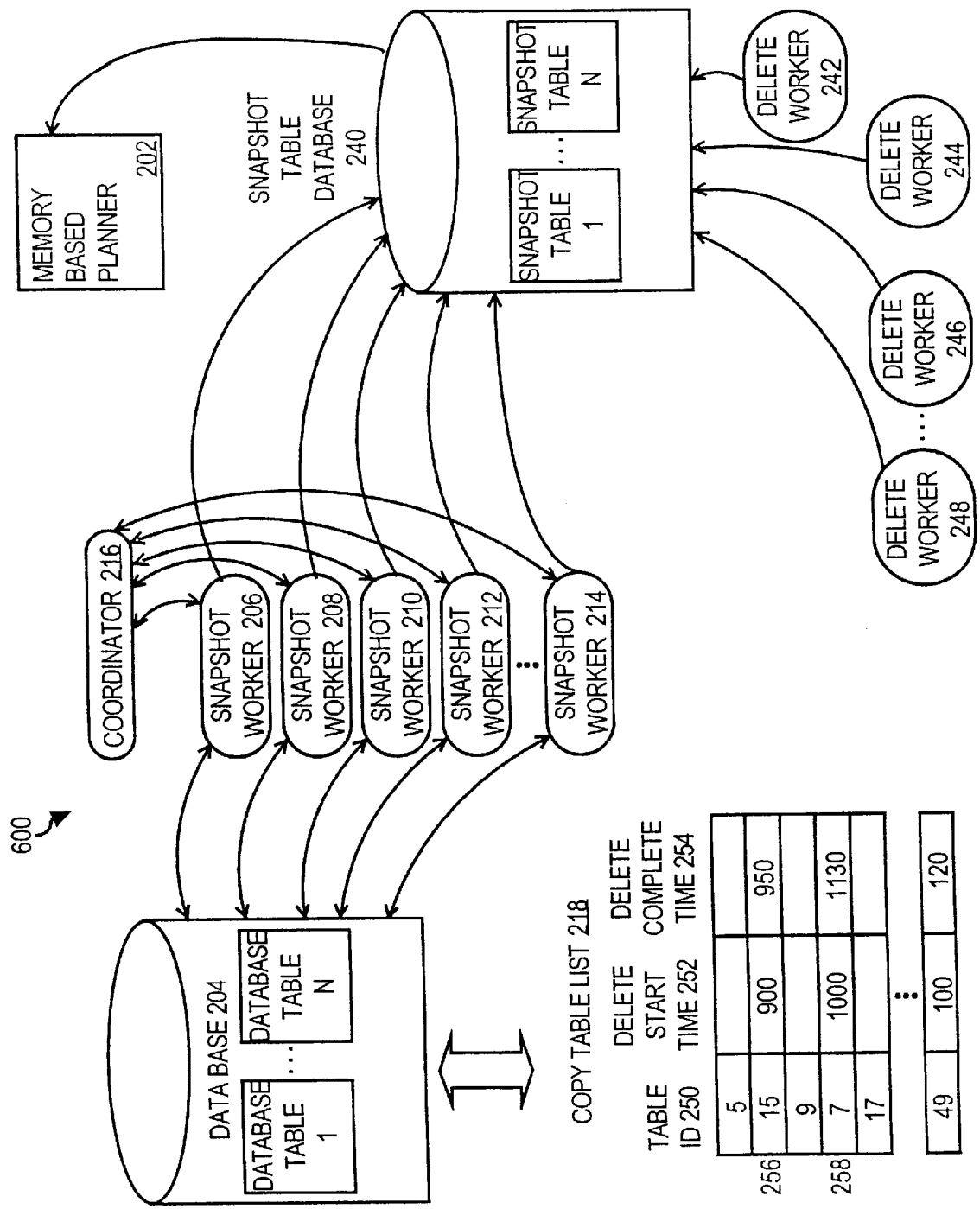
FIG. 6 is a block diagram of alternate system for producing a copy of a database in accordance with an embodiment of the present invention.

FIG. 6 depicts a block diagram of a system 600 that is used for producing a copy of a database in accordance with an embodiment of the present invention. FIG. 6 is similar to FIG. 2, and therefore like components have been numbered alike.

As illustrated in FIG. 6, snapshot workers (206–214) retrieve database table information from database 204 and copy it directly into the snapshot table database 240. By writing directly to the snapshot table database 240, the intermediate steps of copying data to flat files and launching loader workers to copy that data from the flat files into the snapshot table database 240 can be eliminated. In one embodiment, the snapshot workers (206–214) copy the database tables (1..N) in database 204 directly into temporary files in snapshot table database 240. These temporary files are used by the memory based planner 202 for generating a planning schedule.

In an alternative embodiment, the snapshot workers (206–214) copy the desired database tables (1..N) in database 204 directly into snapshot table database 240 as "large binary objects" (BLOBs). In general, a BLOB is a data item that consists of a large amount of data and may be used by systems that require data types that are typically much larger than traditional data types. For example, a single BLOB may include four gigabytes of data and may be thought of as a file or a stream of characters or bytes.

In certain embodiments, snapshot workers (206–214) retrieve database table information from database 204 and copy it as separate data back into database 204. By copying the database table information from database 204 as separate data in database 204, the intermediate steps of copying the data to flat files can be eliminated. In one embodiment, the desired database tables (1..N) in database 204 are directly copied as separate BLOBs in database 204.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for supplying a consistent set of data to a software application, the method comprising the steps of:

launching said software application;

identifying a particular set of data that is required by the software application;

requesting a first process to obtain a snapshot time from a database server associated with a first database, wherein the snapshot time causes all subsequent reads of said first database by the first process to return data that reflects a database state associated with the snapshot time;

after the first process obtains the snapshot time, causing the first process to extract the particular set of data from the first database; and supplying said software application with the particular set of data that was extracted from the first database.

2. The method of claim 1, further comprising the step of causing a second process to store the particular set of data in a second database.

3. The method of claim 2, wherein the step of causing the second process to store the particular set of data in the second database includes the steps of:
   writing the particular set of data to one or more flat files; and
   executing a loader process, wherein the loader process loads the particular set of data from the one or more flat files to the second database.

4. The method of claim 3, wherein the step of writing the particular set of data to one or more flat files includes the steps of:
   the first process informing a coordinator process when it has finished writing data to a particular flat file; and
   the coordinator using the information to tell the loader process when it can begin loading the flat file into the second database.

5. The method of claim 3, wherein the step of:
   writing the particular set of data to the flat file includes the step of writing the particular set of data to a plurality of flat files; and
   executing the loader process includes the step of executing a plurality of loader processes, wherein the plurality of loader processes load the particular set of data from the plurality of flat files to the second database.

6. The method of claim 2, wherein the step of supplying said software application with data from said particular set of data includes the steps of:
   said software application reading the particular set of data stored in the second database; and
   said software application generating a planning schedule based on the particular set of data.

7. The method of claim 1, wherein the step of identifying the particular set of data includes the step of creating a copy table list, wherein the copy table list contains entries that identify the particular set of data in the first database.

8. The method of claim 7, further comprising the steps of:
   executing a delete process, wherein the delete process uses the copy table list to identify data that needs to be deleted in a second database; and
   deleting the identified data from the second database.

9. The method of claim 7, where the step of creating the copy table list includes the steps of:
   communicating with the software application to identifying a set of planning data, where the planning data is required for generating a planning schedule; and
   creating the copy table list based on the identified set of planning data.

10. The method of claim 1, wherein the step of supplying said software application with data from said particular set of data includes the steps of:
    writing the particular set of data to one or more flat files; and
    supplying the one or more flat files to said software application, wherein said software application generates a planning schedule based on information contained in the one or more flat files.

11. A method for producing a copy of data from a first database, the method comprising the steps of:
    locking a first set of data in the first database;
    after locking the first set of data,
       requesting a plurality of processes to obtain snapshot times from a database server associated with said first database, wherein the snapshot times cause all subsequent reads of the first database by the plurality of processes to return data from the first database as of said snapshot times;
    waiting a particular period of time for the plurality of processes to be assigned snapshot times;
    releasing the locks on the first set of data in the first database;
    using a successful set of said plurality of processes to extract a copy of the first set of data from the first database, wherein said successful set includes only those processes of the plurality of processes that were assigned a snapshot time within the particular period of time; and
    storing the copy of the first set of data separate from said first of data.

12. The method of claim 11, wherein the step of identifying the first set of data includes the step of creating a copy table list, wherein the copy table list contains entries that identify the first set of data in the first database.

13. The method of claim 12, where the step of creating the copy table list includes the steps of:
    identifying a set of planning data, where the planning data is required to generate a planning schedule; and
    creating the copy table list based on the planning data required to generate the planning schedule.

14. The method of claim 12, further comprising the steps of:
    executing a plurality of delete processes, wherein the plurality of delete processes use the copy table list to identify data that needs to be deleted in a second database; and
    deleting the identified data from the second database.

15. The method of claim 11, wherein the step of storing the copy of the first set of data includes the steps of:
    writing the copy of the first set of data to a plurality of flat files; and
    executing a plurality of loader processes, wherein the plurality of loader processes load the copy of the first set of data from the plurality of flat files to a second database.

16. The method of claim 15, wherein:
    the steps of writing the copy of the first set of data to a plurality of flat files further includes the step of notifying a coordinator process that data has been written to one of the plurality of flat files; and
    the steps of executing the plurality of loader processes further includes the step of the coordinator, upon being notified that data has been written to one of the plurality of flat files, launching a loader process to load the first set of data from one of the plurality of flat files to the second database.

17. The method of claim 15, wherein the step of writing the copy of the first set of data to the plurality of flat files includes the steps of:
    the plurality of process informing a coordinator process when it has finished writing data to a particular flat file; and
    the coordinator using the information to tell one of the plurality of loader processes when it can begin loading the particular flat file into the second database.

18. The method of claim 11, wherein the step of requesting the plurality of processes to obtain a snapshot time includes the step of requesting the plurality of processes based on a user input parameter, wherein the user input parameter identifies how many processes should be requested to obtain a snapshot time.

19. The method of claim 11, wherein the step of extracting the copy of the first set of data from the database includes the steps of:

assigning a set of copy data to the plurality of snapshot processes; and retrieving data from the first database based on the set of copy data that was assigned to the plurality of snapshot processes.

20. The method of claim 11, wherein the step of storing the copy of the first set of data includes the steps of storing the copy of the first set of data as blob files that are separate from said first of data.

21. The method of claim 11, wherein the step of storing the copy of the first set of data includes the steps of storing the copy of the first set of data in said first of data.

22. A computer-readable medium carrying one or more sequences of one or more instructions for supplying a consistent set of data to a software application, the one or more sequences of one or more instructions including instructions which, when executed by one or more processors, cause the one or more processors to perform the steps of:

launching said software application;

identifying a particular set of data that is required by the software application;

requesting a first process to obtain a snapshot time from a database server associated with a first database, wherein the snapshot time causes all subsequent reads of said first database by the first process to return data that reflects a database state associated with the snapshot time;

after the first process obtains the snapshot time, causing the first process to extract the particular set of data from the first database; and supplying said software application with the particular set of data that was extracted from the first database.

23. The computer-readable medium of claim 22, wherein the computer-readable medium further comprises instructions for performing the step of causing a second process to store the particular set of data in a second database.

24. The computer-readable medium of claim 23, wherein the step of causing the second process to store the particular set of data in the second database includes the steps of:

writing the particular set of data to one or more flat files; and executing a loader process, wherein the loader process loads the particular set of data from the one or more flat files to the second database.

25. The computer-readable medium of claim 24, wherein the step of writing the particular set of data to one or more flat files includes the steps of:

the first process informing a coordinator process when it has finished writing data to a particular flat file; and the coordinator using the information to tell the loader process when it can begin loading the flat file into the second database.

26. The computer-readable medium of claim 22, wherein the step of identifying the particular set of data includes the step of creating a copy table list, wherein the copy table list contains entries that identify the particular set of data in the first database.

27. A computer-readable medium carrying one or more sequences of one or more instructions for producing a copy of data from a first database, the one or more sequences of one or more instructions including instructions which, when executed by one or more processors, cause the one or more processors to perform the steps of:

locking a first set of data in the first database;

after locking the first set of data, requesting a plurality of processes to obtain snapshot times from a database server associated with said first database, wherein the snapshot times cause all subsequent reads of the first database by the plurality of processes to return data from the first database as of said snapshot times;

waiting a particular period of time for the plurality of processes to be assigned snapshot times;

releasing the locks on the first set of data in the first database;

using a successful set of said plurality of processes to extract a copy of the first set of data from the first database, wherein said successful set includes only those processes of the plurality of processes that were assigned a snapshot time within the particular period of time; and storing the copy of the first set of data separate from said first of data.

28. The computer-readable medium of claim 27, wherein the step of identifying the first set of data includes the step of creating a copy table list, wherein the copy table list contains entries that identify the first set of data in the first database.

29. The computer-readable medium of claim 27, wherein the step of storing the copy of the first set of data includes the steps of:

writing the copy of the first set of data to a plurality of flat files; and executing a plurality of loader processes, wherein the plurality of loader processes load the copy of the first set of data from the plurality of flat files to a second database.

30. The computer-readable medium of claim 29, wherein the step of writing the copy of the first set of data to the plurality of flat files includes the steps of:

the plurality of process informing a coordinator process when it has finished writing data to a particular flat file; and the coordinator using the information to tell one of the plurality of loader processes when it can begin loading the particular flat file into the second database.

31. The computer-readable medium of claim 27, wherein the step of extracting the copy of the first set of data from the database includes the steps of:

assigning a set of copy data to the plurality of snapshot processes; and retrieving data from the first database based on the set of copy data that was assigned to the plurality of snapshot processes.

32. A computer system for supplying a consistent set of data to a software application, the computer system comprising:

a memory;

one or more processors coupled to the memory; and a set of computer instructions contained in the memory, the set of computer instructions including computer instructions which when executed by the one or more processors, cause the one or more processors to perform the steps of:

launching said software application;

identifying a particular set of data that is required by the software application;

requesting a first process to obtain a snapshot time from a database server associated with a first database, wherein the snapshot time causes all subsequent reads of said first database by the first process to return data that reflects a database state associated with the snapshot time;

after the first process obtains the snapshot time, causing the first process to extract the particular set of data from the first database; and supplying said software application with the particular set of data that was extracted from the first database.

33. The computer system of claim 32, further including instructions for performing the step of causing a second process to store the particular set of data in a second database.

34. The computer system of claim 33, wherein the step of causing the second process to store the particular set of data in the second database includes the steps of:

writing the particular set of data to one or more flat files; and executing a loader process, wherein the loader process loads the particular set of data from the one or more flat files to the second database.

35. The computer system of claim 34, wherein the step of writing the particular set of data to one or more flat files includes the steps of:

the first process informing a coordinator process when it has finished writing data to a particular flat file; and the coordinator using the information to tell the loader process when it can begin loading the flat file into the second database.

36. The computer system of claim 32, wherein the step of identifying the particular set of data includes the step of creating a copy table list, wherein the copy table list contains entries that identify the particular set of data in the first database.

37. A computer system for producing a copy of data from a first database, the computer system comprising:

a memory;

one or more processors coupled to the memory; and a set of computer instructions contained in the memory, the set of computer instructions including computer instructions which when executed by the one or more processors, cause the one or more processors to perform the steps of:

locking a first set of data in the first database;

after locking the first set of data, requesting a plurality of processes to obtain snapshot times from a database server associated with said first database, wherein the snapshot times cause all subsequent reads of the first database by the plurality of processes to return data from the first database as of said snapshot times;

waiting a particular period of time for the plurality of processes to be assigned snapshot times;

releasing the locks on the first set of data in the first database;

using a successful set of said plurality of processes to extract a copy of the first set of data from the first database, wherein said successful set includes only those processes of the plurality of processes that were assigned a snapshot time within the particular period of time; and storing the copy of the first set of data separate from said first of data.

38. The computer system of claim 37, wherein the step of identifying the first set of data includes the step of creating a copy table list, wherein the copy table list contains entries that identify the first set of data in the first database.

39. The computer system of claim 37, wherein the step of storing the copy of the first set of data includes the steps of:

writing the copy of the first set of data to a plurality of flat files; and executing a plurality of loader processes, wherein the plurality of loader processes load the copy of the first set of data from the plurality of flat files to a second database.

40. The computer system of claim 39, wherein the step of writing the copy of the first set of data to the plurality of flat files includes the steps of:

the plurality of process informing a coordinator process when it has finished writing data to a particular flat file; and the coordinator using the information to tell one of the plurality of loader processes when it can begin loading the particular flat file into the second database.

41. The computer system of claim 37, wherein the step of extracting the copy of the first set of data from the database includes the steps of:

assigning a set of copy data to the plurality of snapshot processes; and retrieving data from the first database based on the set of copy data that was assigned to the plurality of snapshot processes.

* * * * *